Patented July 19, 1949

UNITED STATES PATENT OFFICE 2,476,818

METHOD OF CURING RUBBER AND PRODUCT RESULTING THEREFROM

Edward L. Carr, Akron, Ohio, and John Richard Rafter, Sharon, Mass., assignors to The Firestone Tire & Rubber Company, Akron, Ohio, a corporation of Ohio No Drawing. Application March 20, 1945, Serial No. 583,858

15 Claims. (Cl. 260—785)

This invention relates to metal-halide addition compounds of sulfenamides which are accelerators of the vulcanization of rubbers. Examples are the metal-halide addition compounds of the thiazolinyl sulfenamides, the metal-halide addition compounds of the thiazyl sulfenamides, and the metal-halide addition compounds of the thiocarbamyl sulfenamides. They are represented by the following formulae:

I.

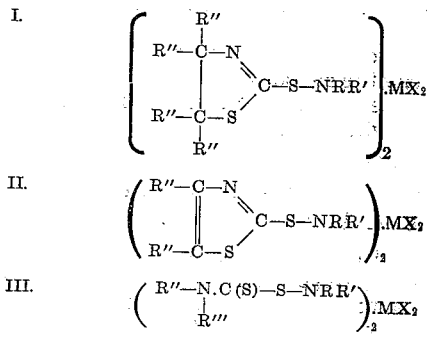

II.

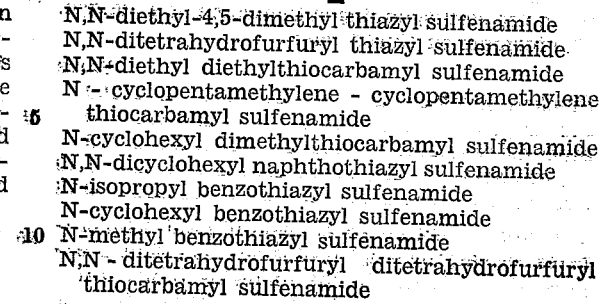

III.

in which R, R', and R'', which may all be the same or different, are hydrogen or a hydrocarbon alkyl (including hydrocarbon cycloalkyl), hydrocarbon aryl or hydrocarbon aralkyl substituent or furfuryl or tetrahydrofurfuryl or NRR' may be a heterocyclic group in which RR' is alkylene or alkylene-oxy-alkylene as in diethylene-oxy, as for example, piperidyl, morpholyl, etc.; R''' is a hydrocarbon alkyl (including hydrocarbon cycloalkyl), hydrocarbon aryl or hydrocarbon aralkyl substituent or furfuryl or tetrahydrofurfuryl; and MX₂ is a complex-forming halide salt of a bivalent metal, such as zinc, copper, cadmium, etc., and X is chlorine, bromine or iodine. Furthermore, in Formula II the R'' may be joined with the double-bonded carbons to form an arylene group, such as benzo-, tetrahydrobenzo-, etc., and in Formula III the R'' and R''' may join with the nitrogen to form a heterocyclic group in which R''R''' is alkylene or alkylene-oxy-alkylene, such as piperidyl, morpholyl, etc.

Typical compounds are the zinc-chloride, etc., addition compounds of:

N-furfuryl thiazolinyl sulfenamide
N-methyl thiazolinyl sulfenamide
N,N-diethyl thiazolinyl sulfenamide
N-cyclohexyl thiazolinyl sulfenamide
N-cyclohexyl-4-methyl thiazolinyl sulfenamide
N-cyclohexyl-4,5-dimethyl thiazyl sulfenamide
N-isopropyl-4,5-dimethyl thiazyl sulfenamide
N-cyclohexyl-4-ethyl thiazyl sulfenamide
N-ethyl-4-ethyl thiazyl sulfenamide N,N-diethyl-4,5-dimethyl thiazyl sulfenamide
N,N-ditetrahydrofurfuryl thiazyl sulfenamide
N,N-diethyl diethylthiocarbamyl sulfenamide
N - cyclopentamethylene - cyclopentamethylene thiocarbamyl sulfenamide
N-cyclohexyl dimethylthiocarbamyl sulfenamide
N,N-dicyclohexyl naphthothiazyl sulfenamide
N-isopropyl benzothiazyl sulfenamide
N-cyclohexyl benzothiazyl sulfenamide
N-methyl benzothiazyl sulfenamide
N,N - ditetrahydrofurfuryl ditetrahydrofurfuryl thiocarbamyl sulfenamide Each of the above-mentioned sulfenamides may be produced by any of the usual sulfenamide reactions which employ water-soluble amines. However, the invention is not limited to such sulfenamides but includes the addition products of all sulfenamides suitable for use in plastics. Sulfenamides produced from insoluble amines, such as sulfenamides with aromatic substituents, long-chain aliphatic substituents, etc., may be produced by metathesis. For example, N-dodecyl benzothiazyl sulfenamide may be produced by dissolving benzothiazyl sulfenamide in dodecyl amine and allowing the mixture to stand until the reaction has taken place. Similarly, N-phenyl thiazolinyl sulfenamide, N-tolyl thiazyl sulfenamide, and N-phenyl dimethyl carbamyl sulfenamide are illustrative of aryl-substituted compounds formed in this manner from which metal halide complexes of this invention may be formed.

The zinc-chloride addition products are accelerators of the vulcanization of natural rubber. The formation of the complex permits converting a low-melting or liquid sulfenamide into a higher-melting or solid compound, thus rendering the accelerator more stable or more easily handled. The addition products give a slower cure than the sulfenamides from which they are formed and are delayed-action accelerators. The vulcanized products are different from those produced with the sulfenamides. For instance, the zinc-chloride addition compounds give a lower modulus natural rubber stock than the parent sulfenamides and may be used in obtaining softer stocks.

Other salts, such as the cupric-chloride salts, may be used in the vulcanization of synthetic rubbers, etc., such as the rubber-like copolymer of butadiene and styrene, in which copper derivatives have no detrimental effect. The cadmium salts may be used in curing rubber and rubber-like materials.

The following examples are typical and illustrate the preparation of different complexes from N-cyclohexyl benzothiazyl sulfenamide:

Example 1

An ether solution of N-cyclohexyl benzothiazyl sulfenamide was mixed with an ether solution of zinc chloride. The proportions of reactants were 2 mols sulfenamide to 1 mol zinc chloride. Immediate reaction occurred giving a quantitative yield of the addition product or salt which was a white, granular solid, M. P. 150–160° C. This product had the formula:

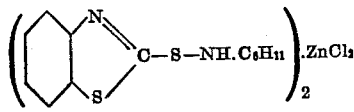

The melting point of the parent sulfenamide is 100–102° C.

The addition product was tested in rubber, using the corresponding sulfenamide as a control. The formula employed was:

|  | Parts |
| --- | --- |
| Smoked sheet | 100 |
| Sulfur | 3 |
| Zinc oxide | 5 |
| Stearic acid | 1.10 |
| Accelerator | 0.75 |

The stocks were cured at two different temperatures for varying lengths of time. The time is expressed in minutes in the following table, which gives the modulus and tensile strength for the control and the test material in pounds per square inch:

|  | 600% Modulus | | | | Tensile at Break | | | |
| --- | --- | --- | --- | --- | --- | --- | --- | --- |
|  | 30 | 60 | 90 | 120 | 30 | 60 | 90 | 120 |
| Cured at 240° F.: | | | | | | | | |
| Control | | | 750 | 1800 | | | 2650 | 3600 |
| Test material | | | | 375 | | | | 2100 |
| Cured at 280° F.: | | | | | | | | |
| Control | 2500 | 2300 | 1825 | | 3725 | 3675 | 3425 | |
| Test material | 1350 | 1525 | 1300 | | 3550 | 3250 | 3425 | |

The above results show that the zinc chloride affects the modulus more than the tensile strength and serves to prevent the stock from curing too stiff.

The zinc-chloride salt of N-cyclopentamethylene cyclopentamethylene thiocarbamyl sulfenamide was similarly prepared. It was found to have a melting point of 110° C. as compared with a melting point of 100–102° C. for the parent sulfenamide. The formula for this compound is:

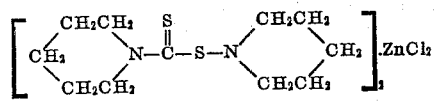

For the preparation of cupric salts, some other solvent than ether will be preferred, as, for example, ethyl alcohol.

Example 2

Seventeen grams $CuCl_2.2H_2O$ were dissovled in 100 cc. ethyl alcohol to a dark green, clear solution. Fifty-three grams N-cyclohexyl benzothiazyl sulfenamide were dissolved in 700 cc. ethyl alcohol to which was added 100 cc. benzene. The mixture immediately became dark in color, and after a few minutes a chocolate-brown solid separated out. The solid was washed twice with ether. The melting point of the product, N-cyclohexyl benzothiazyl sulfenamide cupric chloride, was 160° C.

What we claim is:

1. The method of curing rubber which comprises reacting the rubber with sulfur in the presence of an accelerator selected from the class of compounds having the formula

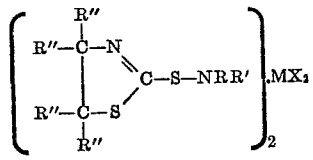

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, and $MX_2$ is a complex-forming salt in which M is a bivalent metal and X is a halide radical of the class consisting of chloride, bromide and iodide.

2. The method of curing rubber which comprises reacting the rubber with sulfur in the presence of an accelerator selected from the class of compounds having the formula

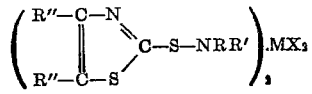

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydocarbon aryl and hydrocarbon aralkyl, also where the two R'' form with the double-bonded carbons a radical from the group consisting of arylene and partially hydrogenated arylene; and $MX_2$ is a complex-forming salt in which M is a bivalent metal and X is a halide radical of the class consisting of chloride, bromide and iodide.

3. The method of curing rubber which comprises reacting the rubber with sulfur in the presence of an accelerator selected from the class of compounds having the formula

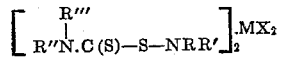

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, where R''' is selected from the group of radicals consisting of hydrogen, furfuryl, tetrahydrofurfuryl, hydrocarbon alkyl, hydrocarbon aryl and hydrocarbon aralkyl, also where NR''R''' is a heterocyclic radical in which R''R''' is selected from the group consisting of alkylene and alkylene-oxy-alkylene; and MX₂ is a complex-forming salt in which M is a bivalent metal and X is a halide radical of the class consisting of chloride, bromide and iodide.

4. A vulcanizable rubber composition which contains an accelerator selected from the class of compounds having the formula

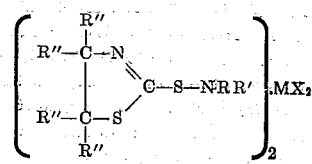

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, and MX₂ is a complex-forming salt in which M is a bivalent metal and X is a halide radical of the class consisting of chloride, bromide and iodide.

5. A vulcanizable rubber composition which contains an accelerator selected from the class of compounds having the formula

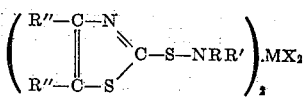

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, also where the two R'' form with the double-bonded carbons a radical from the group consisting of arylene and partially hydrogenated arylene; and MX₂ is a complex-forming salt in which M is a bivalent metal and X is a halide radical of the class consisting of chloride, bromide and iodide.

6. A vulcanizable rubber composition which contains an accelerator selected from the class of compounds having the formula

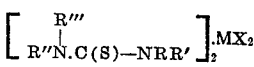

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, where R''' is selected from the group of radicals consisting of hydrogen, furfuryl, tetrahydrofurfuryl, hydrocarbon alkyl, hydrocarbon aryl and hydrocarbon aralkyl, also where NR''R''' is a heterocyclic radical in which R''R''' is selected from the group consisting of alkylene and alkylene-oxy-alkylene; and MX₂ is a complex-forming salt in which M is a bivalent metal and X is a halide radical of the class consisting of chloride, bromide and iodide.

7. Rubber which has been cured with sulfur in the presence of an accelerator selected from the class of compounds having the formula

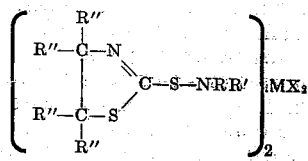

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, and MX₂ is a complex-forming salt in which M is a bivalent metal and X is a halide radical of the class consisting of chloride, bromide and iodide.

8. Rubber which has been cured with sulfur in the presence of an accelerator selected from the class of compounds having the formula

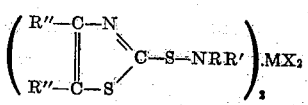

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, also where the two R'' form with the double-bonded carbons a radical from the group consisting of arylene and partially hydrogenated arylene; and MX₂ is a complex-forming salt in which M is a bivalent metal and X is a halide radical of the class consisting of chloride, bromide and iodide.

9. Rubber which has been cured with sulfur in the presence of an accelerator selected from the class of compounds having the formula

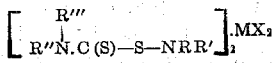

where R is selected from the group of radicals consisting of hydrogen, furfuryl, tetrahydrofurfuryl, hydrocarbon alkyl, hydrocarbon aryl and hydrocarbon aralkyl, where R' is selected from the group of radicals consisting of hydrogen, furfuryl, tetrahydrofurfuryl, hydrocarbon alkyl, hydrocarbon aryl and hydrocarbon aralkyl, also where NRR' is a heterocyclic radical in which RR' is selected from the group consisting of alkylene and alkylene-oxy-alkylene; where R'' is selected from the group of radicals consisting of hydrogen, furfuryl, tetrahydrofurfuryl, hydrocarbon alkyl, hydrocarbon aryl and hydrocarbon aralkyl, where R''' is selected from the group of radicals consisting of hydrogen, furfuryl, tetrahydrofurfuryl, hydrocarbon alkyl, hydrocarbon aryl and hydrocarbon aralkyl, also where NR''R''' is a heterocyclic radical in which R''R''' is selected from the group consisting of alkylene and alkylene-oxy-alkylene; and $MX_2$ is a complex-forming salt in which M is a bivalent metal and X is a halide radical of the class consisting of chloride, bromide and iodide.

10. The method of curing rubber which comprises reacting the rubber with sulfur in the presence of N-cyclohexyl benzothiazyl sulfenamide zinc chloride, as an accelerator.

11. A vulcanizable rubber composition which contains as an accelerator N-cyclohexyl benzothiazyl sulfenamide zinc chloride.

12. Rubber which has been cured with sulfur in the presence of N-cyclohexyl benzothiazyl sulfenamide zinc chloride, as an accelerator.

13. The method of curing rubber which comprises reacting the rubber with sulfur in the presence of an accelerator which is a complex-forming bivalent-metal-chloride addition product of a sulfenamide of the group consisting of the unsubstituted and substituted—(a) thiazolinyl, (b) thiazyl and (c) thiocarbamyl sulfenamides, the substituents being selected from the group of radicals consisting of furfuryl, tetrahydrofurfuryl, hydrocarbon alkyl, hydrocarbon aryl and hydrocarbon aralkyl, said sulfenamides consisting of the class in which (1) the sulfenamide group is unsubstituted and in which (2) it is substituted by one substituent and in which (3) it is substituted by two substituents said substituents being of the class consisting of furfuryl, tetrahydrofurfuryl, hydrocarbon alkyl, hydrocarbon aryl and hydrocarbon aralkyl, and in which (4) the two N-hydrogens are replaced by a bivalent radical of the class consisting of alkylene and alkylene-oxy-alkylene.

14. A vulcanizable rubber composition which contains an accelerator which is a complex-forming bivalent-metal-chloride addition product of a sulfenamide of the group consisting of the unsubstituted and substituted—(a) thiazolinyl, (b) thiazyl and (c) thiocarbamyl sulfenamides, the substituents being selected from the group of radicals consisting of furfuryl, tetrahydrofurfuryl, hydrocarbon alkyl, hydrocarbon aryl and hydrocarbon aralkyl, said sulfenamides consisting of the class in which (1) the sulfenamide group is unsubstituted and in which (2) it is substituted by one substituent and in which (3) it is substituted by two substituents said substituents being of the class consisting of furfuryl, tetrahydrofurfuryl, hydrocarbon alkyl, hydrocarbon aryl and hydrocarbon aralkyl, and in which (4) the two N-hydrogens are replaced by a bivalent radical of the class consisting of alkylene and alkylene-oxy-alkylene.

15. Rubber which has been cured with sulfur in the presence of an accelerator which is a complex-forming bivalent-metal-chloride addition product of a sulfenamide of the group consisting of the unsubstituted and substituted—(a) thiazolinyl, (b) thiazyl and (c) thiocarbamyl sulfenamides, the substituents being selected from the group of radicals consisting of furfuryl, tetrahydrofurfuryl, hydrocarbon alkyl, hydrocarbon aryl and hydrocarbon aralkyl, said sulfenamides consisting of the class in which (1) the sulfenamide group is unsubstituted and in which (2) it is substituted by one substituent and in which (3) it is substituted by two substituents said substituents being of the class consisting of furfuryl, tetrahydrofurfuryl, hydrocarbon alkyl, hydrocarbon aryl and hydrocarbon aralkyl, and in which (4) the two N-hydrogens are replaced by a bivalent radical of the class consisting of alkylene and alkylene-oxy-alkylene.

EDWARD L. CARR.
JOHN RICHARD RAFTER.

REFERENCES CITED

The following references are of record in the file of this patent:

UNITED STATES PATENTS

| Number | Name | Date |
|---|---|---|
| 1,823,499 | Lutz | Sept. 15, 1931 |
| 2,242,208 | Davis | May 20, 1941 |
| 2,271,834 | Carr | Feb. 3, 1942 |
| 2,284,578 | Jones | May 26, 1942 |
| 2,339,552 | Carr | Jan. 18, 1944 |